US012090758B2

(12) United States Patent
Kimura et al.

(10) Patent No.: US 12,090,758 B2
(45) Date of Patent: Sep. 17, 2024

(54) LIQUID EJECTION HEAD AND LIQUID EJECTION APPARATUS

(71) Applicant: CANON KABUSHIKI KAISHA, Tokyo (JP)

(72) Inventors: Satoshi Kimura, Kanagawa (JP); Takuya Iwano, Tokyo (JP); Hiromasa Amma, Kanagawa (JP); Shingo Okushima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 4 days.

(21) Appl. No.: 17/726,849

(22) Filed: Apr. 22, 2022

(65) Prior Publication Data

US 2022/0339935 A1 Oct. 27, 2022

(30) Foreign Application Priority Data

Apr. 26, 2021 (JP) ................................ 2021-074246

(51) Int. Cl.
*B41J 2/14* (2006.01)
*B41J 2/165* (2006.01)

(52) U.S. Cl.
CPC ......... *B41J 2/1433* (2013.01); *B41J 2/16505* (2013.01); *B41J 2002/14491* (2013.01)

(58) Field of Classification Search
CPC ..... B41J 2/1433; B41J 2/16505; B41J 11/005
See application file for complete search history.

(56) References Cited

U.S. PATENT DOCUMENTS

| | | | | |
|---|---|---|---|---|
| 9,527,293 | B2 | 12/2016 | Tamura et al. | |
| 11,780,254 | B2 | 10/2023 | Kawamata | |
| 2010/0026748 | A1 * | 2/2010 | Garcia | B41J 2/155 347/42 |
| 2015/0124022 | A1 * | 5/2015 | Luedeman | B41J 2/16505 347/29 |

FOREIGN PATENT DOCUMENTS

| | | | |
|---|---|---|---|
| JP | 7-314849 | A | 12/1995 |
| JP | 2009-012412 | A | 1/2009 |
| JP | 2016-185683 | A | 10/2016 |
| JP | 2016-203642 | A | 12/2016 |
| JP | 2018-176717 | A | 11/2018 |
| JP | 2019-130678 | A | 8/2019 |
| WO | 2020/158705 | A1 | 8/2020 |

OTHER PUBLICATIONS

Office Action dated Jan. 30, 2024 in Japanese Patent Application No. 2021-074246.

* cited by examiner

*Primary Examiner* — Jason S Uhlenhake
(74) *Attorney, Agent, or Firm* — Venable LLP

(57) ABSTRACT

A liquid ejection head includes a liquid ejection part configured to eject a liquid; and a guide part provided upstream of the liquid ejection part with respect to a conveying direction of a recording medium and configured to guide the front end of the recording medium conveyed to the liquid ejection part. The guide part has an inclined surface inclined so as to be more spaced apart from a conveyance path for the recording medium as the inclined surface is more distant from the liquid ejection part.

17 Claims, 7 Drawing Sheets

LIQUID EJECTION HEAD AND LIQUID EJECTION APPARATUS

BACKGROUND OF THE INVENTION

Field of the Invention

The present disclosure relates to a liquid ejection head that ejects a liquid such as ink.

Description of the Related Art

A liquid ejection apparatus disclosed in Japanese Patent Application Laid-Open No. 2016-203642 has a liquid ejection head having a head cover.

The liquid ejection head has a nozzle plate having ejection orifices for ejecting a liquid, and the head cover has an opening for exposing the ejection orifices. The head cover is fixed to a head so as to cover the outer circumferential part of the nozzle plate. A recording medium such as a recording sheet is conveyed to a position facing the liquid ejection head. The liquid ejection head ejects a liquid to the recording medium.

In the liquid ejection head described above, however, the side surface of a head part covered with the head cover is substantially orthogonal to the conveying direction of the recording medium. Thus, if the leading end of a recording medium is curled, the leading end of the recording medium may come into contact with the side surface of the head part during conveyance, and this may cause jamming (paper jam).

An object of the present embodiment is to make jamming less likely to occur even when the leading end of a recording medium is curved.

SUMMARY OF THE INVENTION

To achieve the object described above, according to one aspect of the present invention, provided is a liquid ejection head including: a liquid ejection part configured to eject a liquid; and a guide part provided upstream of the liquid ejection part with respect to a conveying direction of a recording medium and configured to guide a front end of a recording medium conveyed to the liquid ejection part, in which the guide part has an inclined surface inclined so as to be more spaced apart from a conveyance path for the recording medium as the inclined surface is more distant from the liquid ejection part.

According to another aspect of the present invention, provided is a liquid ejection head including: a liquid ejection part configured to eject a liquid; and a guide part provided upstream of the liquid ejection part with respect to a conveying direction of a recording medium, in which the guide part has an abutment part against which a front end of a recording medium abuts when the front end of the recording medium conveyed toward the liquid ejection part rises up from a support surface for the recording medium, and the abutment part is configured to guide the front end of the recording medium so that the front end enters a space between the liquid ejection part and the support surface.

Further features of the present invention will become apparent from the following description of exemplary embodiments with reference to the attached drawings.

DESCRIPTION OF THE EMBODIMENTS

Embodiments of the present invention will be described below in detail with reference to the drawings. However, components described in the embodiment are mere examples and are not intended to limit the scope of the present invention thereto.

Figure 1:
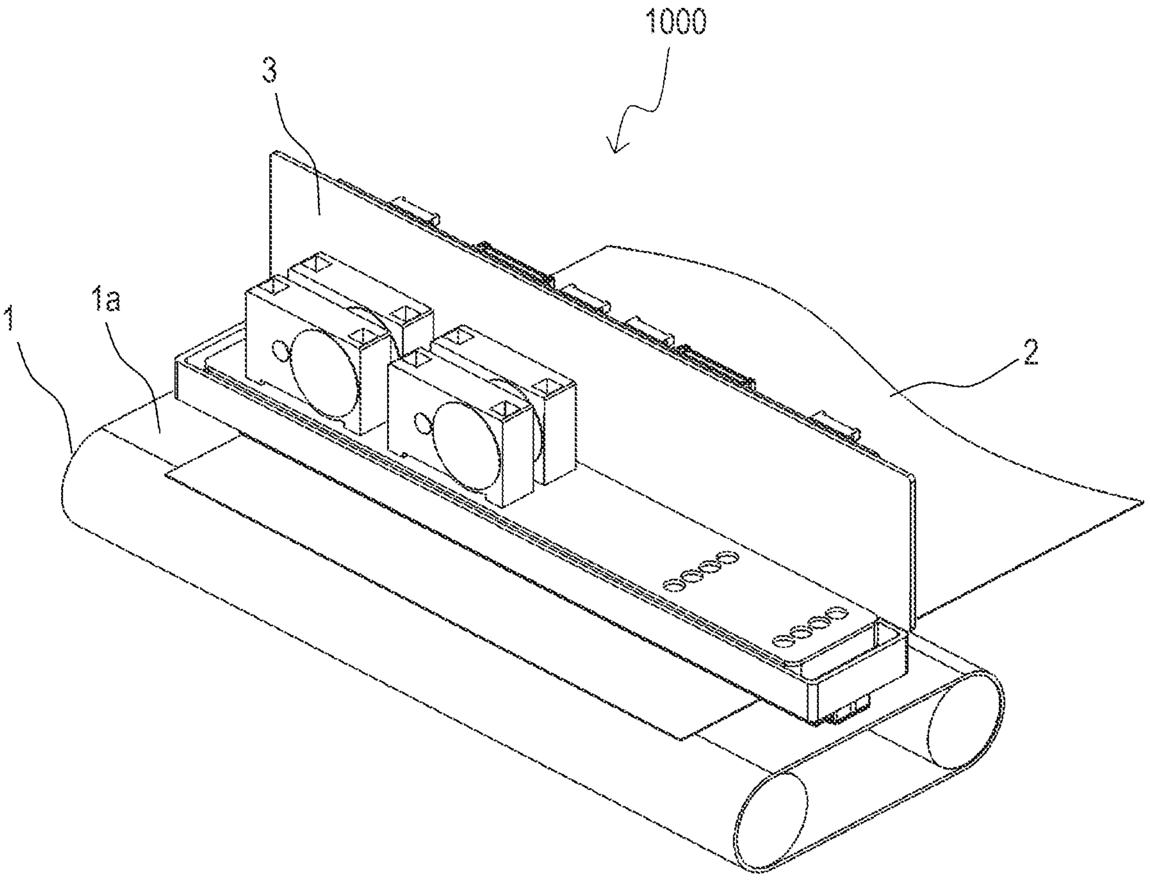
FIG. 1 is a perspective view schematically illustrating a general configuration of a liquid ejection apparatus to which the present invention is applicable.
Figure 3A:
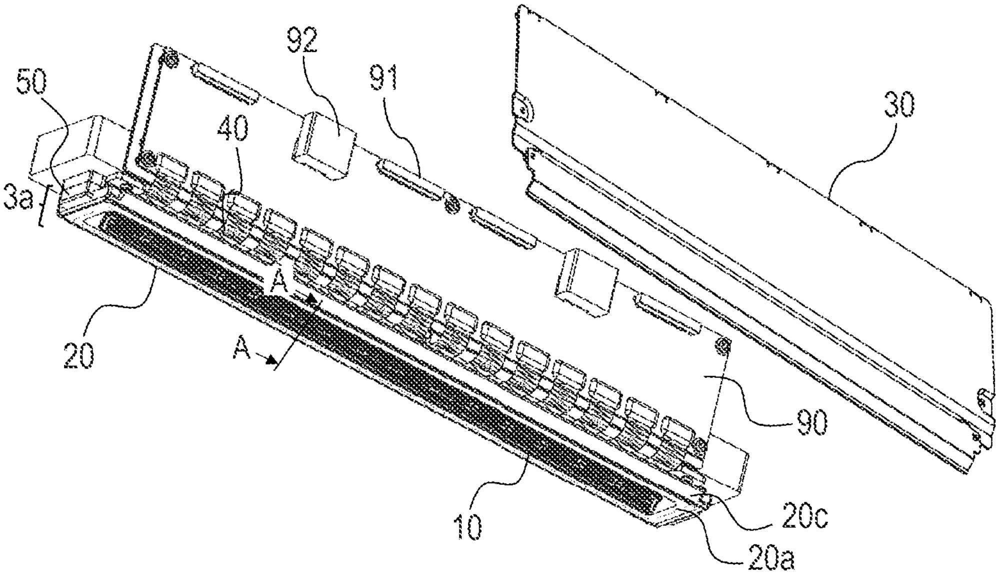
FIG. 3A, FIG. 3B and FIG. 3C are schematic diagrams illustrating a configuration of a liquid ejection head according to one embodiment of the present invention.

FIG. 1 is a perspective view schematically illustrating a general configuration of a liquid ejection apparatus to which the present invention is applicable. A liquid ejection apparatus 1000 includes a conveyance unit 1 that conveys a recording medium 2 and a liquid ejection head 3 that ejects a liquid such as ink. The conveyance unit 1 has a support surface 1*a* that supports the recording medium 2 and conveys the recording medium 2 to the liquid ejection head 3. In FIG. 3A (described later), the arrow A represents the conveying direction of the recording medium 2. The liquid ejection apparatus 1000 includes a conveyance path to convey the recording medium 2 in the conveying direction A. The ink is an example of a liquid.

The liquid ejection head 3 is a so-called line-type head that has a length corresponding to the width of the recording medium 2 and in which the longitudinal direction is in a direction substantially orthogonal to the conveying direction A of the recording medium 2. For example, the liquid ejection head 3 can perform recording continuously while the conveyance unit 1 conveys a plurality of recording media 2 continuously or intermittently. As the recording medium 2, a cut sheet (a sheet cut into a predetermined size) or a continuous rolled sheet may be used.

Figure 2:
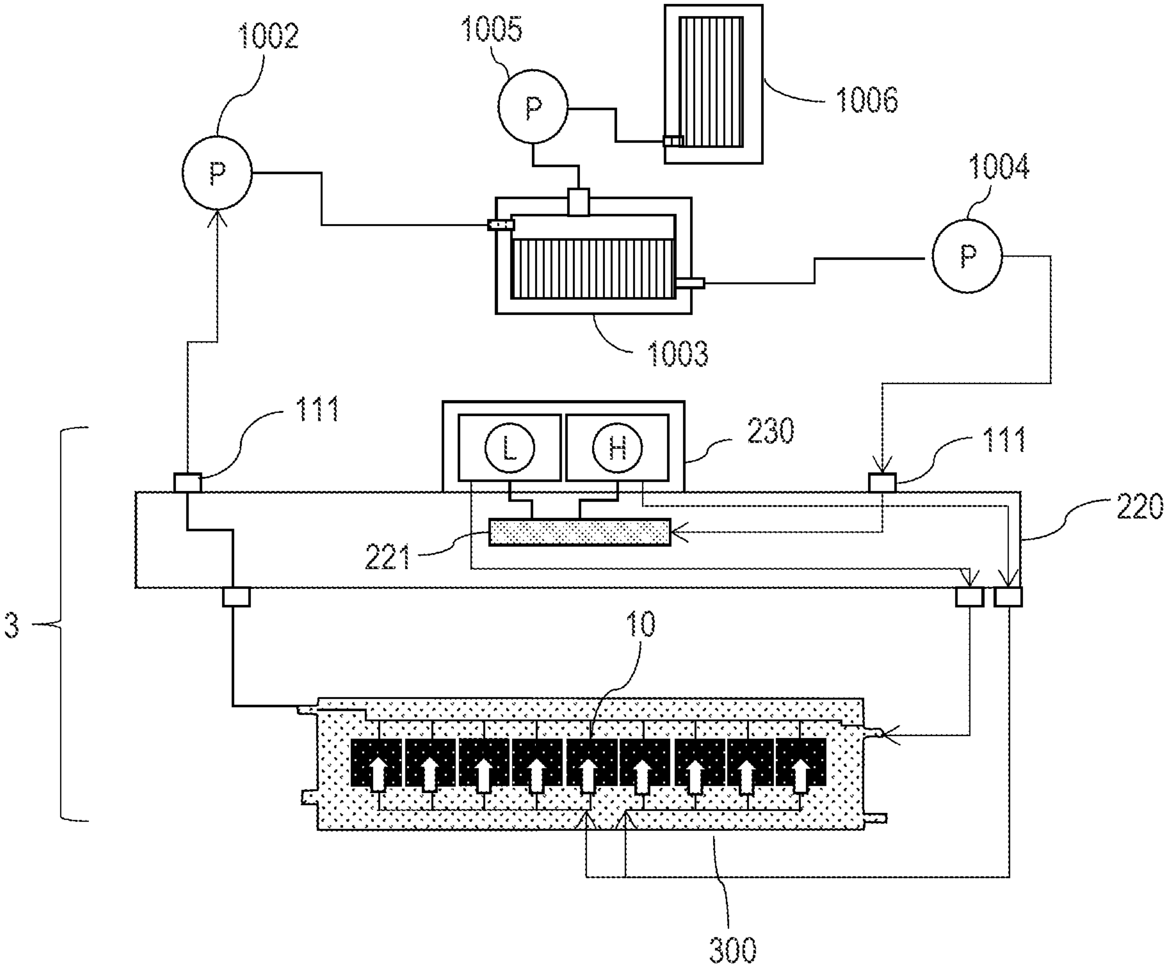
FIG. 2 is a schematic diagram illustrating a liquid circulation path used for supplying a liquid to a liquid ejection head.

FIG. 2 is a schematic diagram illustrating a liquid circulation path used for supplying a liquid to the liquid ejection head 3.

The liquid ejection head 3 has a liquid supply unit 220, a negative pressure control unit 230, and a liquid ejection unit 300. The liquid supply unit 220 includes liquid connection parts 111 on the discharge side and the supply side, respectively, and these liquid connection parts 111 are fluidly connected to a buffer tank 1003 via circulation pumps 1002 and 1004, respectively. The buffer tank 1003 is fluidly connected to a main tank 1006 via an auxiliary pump 1005. The liquid supply unit 220 is provided with a filter 221 used for preventing foreign materials from entering the inside of the head.

The negative pressure control unit 230 controls the pressure in the liquid ejection head 3 and includes a high-pressure side flow path (H) and a low-pressure side flow path (L). It is possible to adjust the negative pressure of the high-pressure side flow path (H) and the low-pressure side flow path (L). The liquid ejection unit 300 has recording element substrates 10 including ejection orifices for ejecting a liquid. The liquid passes through a filter 221 and is then supplied to the high-pressure side flow path (H) and the low-pressure side flow path (L). The high-pressure side flow path (H) and the low-pressure side flow-path (L) merge through each recording element substrate 10. When the circulation pumps 1002 and 1004 operate, a differential pressure is generated in the liquid ejection head 3 by the negative pressure control unit 230, and the entire liquid ejection head 3 is filled with a liquid.

Note that, although only the circulation path through which one color of liquid flows is illustrated in FIG. 2 for simplified illustration, circulation paths are provided on a liquid color basis when multiple colors of liquid are used. For example, when four colors of liquid of cyan, magenta, yellow, and black are used, circulation paths for the four colors are provided.

Figure 3B:
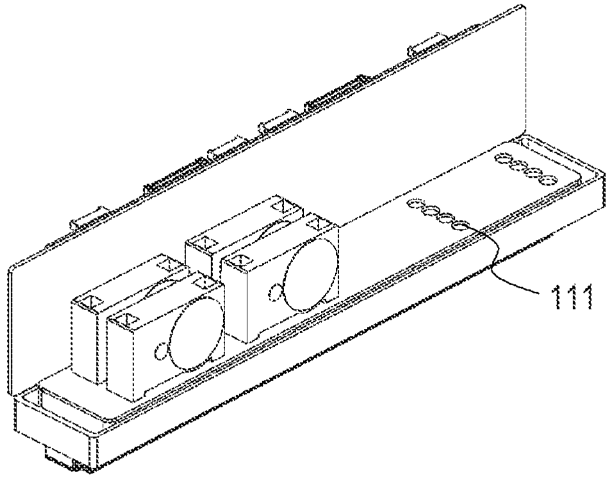
Figure 3C:
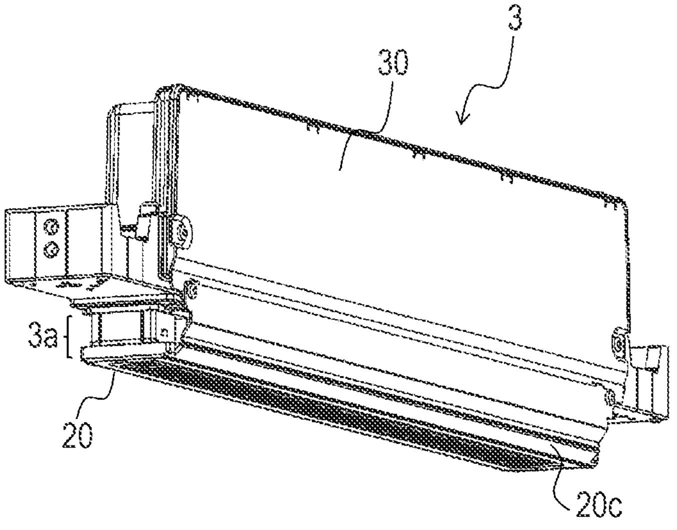

FIG. 3A to FIG. 3C are diagrams schematically illustrating a configuration of the liquid ejection head 3 according to one embodiment of the present invention.

FIG. 3A is a perspective view of the liquid ejection head 3 with a protection member 30 removed when viewed from the ejection side. FIG. 3B is a perspective view of the liquid ejection head 3 with the protection member 30 removed when viewed from a direction opposite to the ejection side. FIG. 3C is a perspective view of the liquid ejection head 3 with the protection member 30 attached.

Figure 4A:
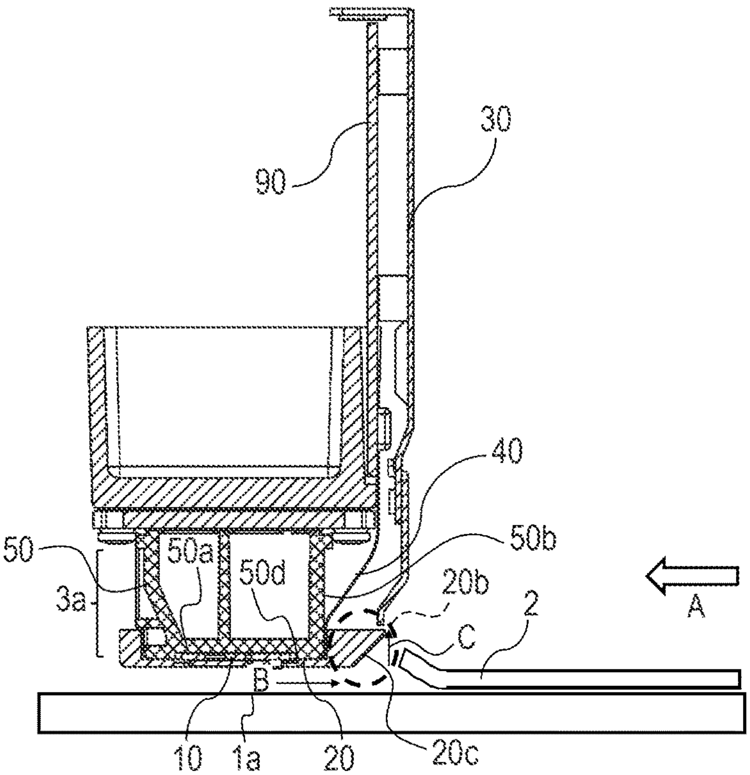
FIG. 4A and FIG. 4B are schematic diagrams illustrating an example of a guide part of a cover member.

As illustrated in FIG. 3A and FIG. 3C, the liquid ejection head 3 has a liquid ejection part 3*a* that ejects a liquid. The liquid ejection part 3*a* has recording element substrates 10 having ejection orifices for ejecting a liquid and a support member 50 having a support surface 50*a* that supports the recording element substrates 10. The support surface 50*a* is provided at a position recessed from the surface of the support member 50 (FIG. 4A). A cover member 20 having an opening 20*a* for exposing the ejection orifices is attached to the support member 50. In this example, 15 recording element substrates 10 are aligned on a straight line, and the ejection orifices of these recording element substrates 10 are exposed from the opening 20*a* of the cover member 20. Note that the number of recording element substrates 10 can be changed as appropriate.

The liquid ejection head 3 further has electric wiring members, namely, flexible wiring boards 40, an electric wiring board 90, signal input terminals 91, and power supply terminals 92. The flexible wiring boards 40 are provided for each recording element substrate 10. Terminals are provided to both ends of each flexible wiring board 40, a terminal of one end is electrically connected to the recording element substrate 10, and a terminal of the other end is electrically connected to the electric wiring board 90. The signal input terminals 91 and the power supply terminals 92 are electrically connected to a control unit of the liquid ejection apparatus 1000. Drive signals and drive power used for driving the recording element substrates 10 are supplied to the recording element substrates 10 via the signal input terminals 91, the power supply terminals 92, the flexible wiring boards 40, and the electric wiring board 90.

For example, by aggregating the wirings on an electric circuit inside the electric wiring board 90, it is possible to reduce the number of signal input terminals 91 and power supply terminals 92 compared to the number of recording element substrates 10. Accordingly, it is possible to reduce the number of electric connection parts that require removal when assembling the liquid ejection head 3 or replacing the liquid ejection head 3 in the liquid ejection apparatus 1000.

The cover member 20 covers a part of each flexible wiring board 40. After the recording element substrates 10 and the flexible wiring boards 40 are attached to the support member 50, the cover member 20 is attached to the support member 50. The protection member 30 protects a part of each flexible wiring board 40 or the electric wiring board 90. It is preferable that the protection member 30 be made of a metal so as to serve as an electric shield.

As illustrated in FIG. 3B, a plurality of liquid connection parts 111 are provided on one side of the liquid ejection head 3. Multiple colors of liquids are supplied to the liquid ejection head 3 via these liquid connection parts 111. In this example, four colors of liquid of cyan, magenta, yellow, and black are used.

The cover member 20 includes a guide part 20*b* that guides the recording medium 2. The configuration of the guide part 20*b* will be described below in detail.

Figure 4B:
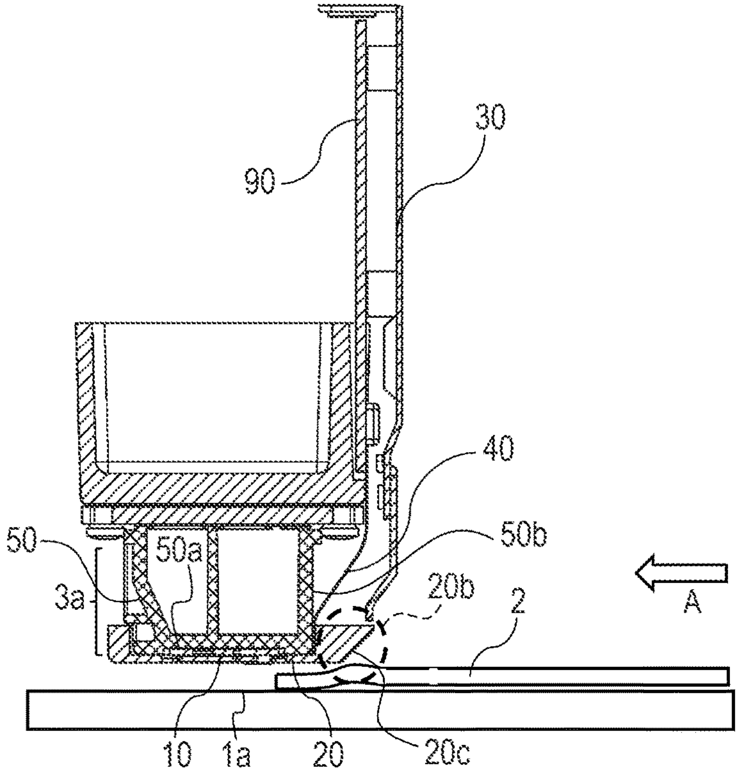

FIG. 4A and FIG. 4B are schematic diagrams illustrating the guide part 20*b* of the cover member 20. Both of FIG. 4A and FIG. 4B are schematic diagrams illustrating the structure of a cross section of the liquid ejection head 3 taken along the line A-A of FIG. 3A with the protection member 30 attached. FIG. 4A illustrates a state where the leading end of the recording medium 2 has reached the guide part 20*b*. FIG. 4B illustrates a state where the leading end of the recording medium 2 has passed through the guide part 20*b* and reached a space between the support surface 1*a* and the liquid ejection head 3.

As illustrated in FIG. 4A and FIG. 4B, the support surface 50*a* of the support member 50 faces the support surface 1*a* of the conveyance unit 1. The recording medium 2 is conveyed to the space between the liquid ejection part 3*a* and the support surface 1*a*, and the recording element substrate 10 ejects a liquid to the recording medium 2. The guide part 20*b* is located upstream of the liquid ejection part 3*a* with respect to the conveying direction A of the recording medium 2. The guide part 20*b* guides the leading end of the recording medium 2 conveyed to the liquid ejection part 3*a*. Specifically, the guide part 20*b* includes an inclined surface 20*c* inclined so as to be more spaced apart from the conveyance path of the recording medium 2 as the inclined surface 20*c* is more distant from the liquid ejection part 3*a*.

In FIG. 4A, the arrow B represents a direction of being distant from the liquid ejection part 3*a*, and the arrow C represents a direction of being spaced apart from the conveyance path. The arrow B is the opposite direction to the conveying direction A of the recording medium 2. The arrow C is a direction crossing the conveying direction A of the recording medium 2 (a direction substantially orthogonal to the conveying direction A in the present embodiment).

As illustrated in FIG. 4A, if the leading end of the recording medium 2 is curved, the leading end of the recording medium 2 comes into contact with the inclined surface 20*c* of the guide part 20*b* when the recording medium 2 is conveyed. The inclined surface 20*c* works to guide the leading end of the recording medium 2 to the space between the support surface 1*a* and the liquid ejection head 3. The leading end of the recording medium 2 moves while sliding on the inclined surface 20*c* and reaches the space between the support surface 1*a* and the liquid ejection head 3, as illustrated in FIG. 4B. In such a way, even if the leading end of the recording medium 2 is curved, the guide part 20*b* can guide the recording medium 2 to the space between the support surface 1*a* and the liquid ejection head 3. This can suppress jamming.

Figure 5A:
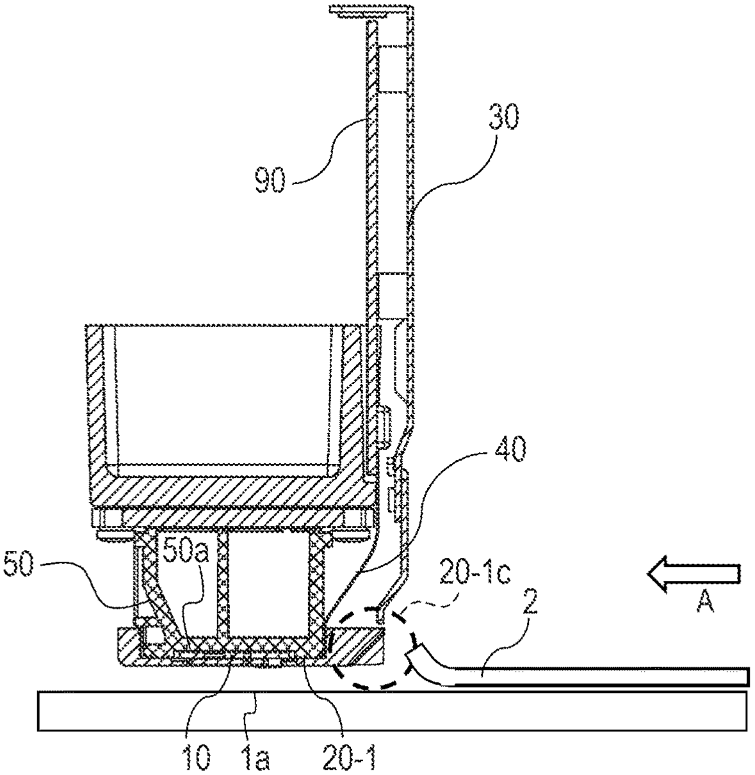
FIG. 5A and FIG. 5B are schematic diagrams illustrating a cover member of a comparative example.
Figure 5B:
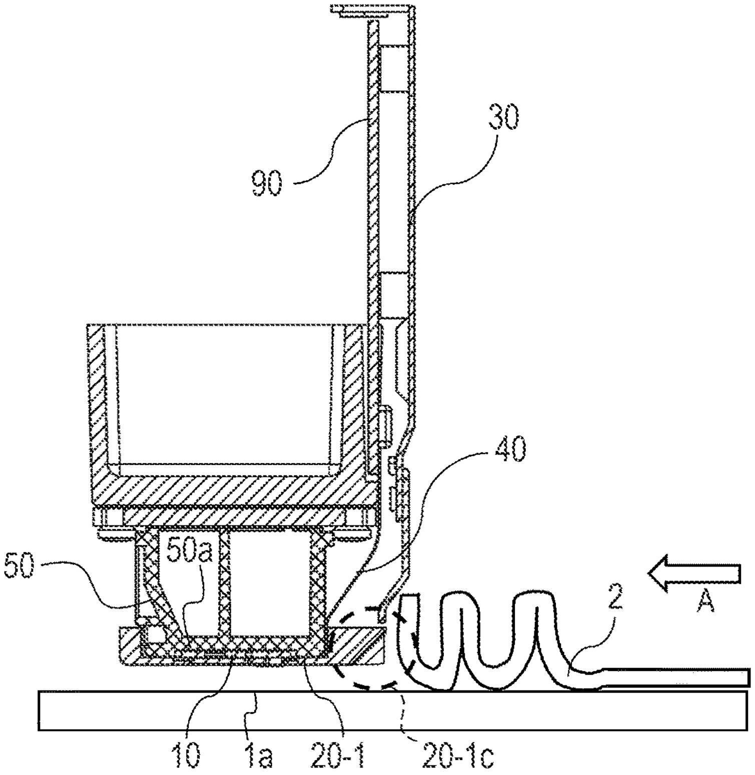

FIG. 5A and FIG. 5B are schematic diagrams illustrating a cover member 20-1 as a comparative example. Both of FIG. 5A and FIG. 5B illustrate the structure corresponding to the cross section of the liquid ejection head 3 illustrated in FIG. 4A and FIG. 4B.

As illustrated in FIG. 5A and FIG. 5B, the cover member 20-1 has an end 20-1*c* having a surface substantially perpendicular to the support surface 1*a*, instead of the guide part 20*b*. The end 20-1*c* is located upstream in the conveying direction A of the recording medium 2. As illustrated in FIG. 5A, when the recording medium 2 having a curved leading end is conveyed, the leading end of the recording medium 2 abuts against the perpendicular surface of the end 20-1*c*. In such a case, the recording medium 2 is not conveyed to the space between the support surface 1*a* and the liquid ejection head 3, and the recording medium 2 is deformed on the front side of the head, and this causes jamming, as illustrated in FIG. 5B. When jamming occurs, it is required to stop a printing operation in order to remove the recording medium 2. Further, due to an impact when the leading end of the recording medium 2 abuts against the end 20-1*c*, the liquid ejection head 3 may be damaged.

As described above, according to the liquid ejection head 3 of the present embodiment, since the recording medium 2 having a curved leading end can be guided to the space between the support surface 1*a* and the liquid ejection head 3, jamming can be suppressed, and a printing operation can be continued.

In addition, the leading end of the recording medium 2 moves while sliding on the inclined surface 20*c*, which mitigates the impact on the liquid ejection head 3. Accordingly, it is possible to suppress the liquid ejection head 3 from being damaged.

In the liquid ejection head 3 of the present embodiment, the support member 50 has a side surface 50*b* on the rear end side with respect to the conveying direction A. The support surface 50*d* and the side surface 50*b* that support the flexible wiring boards 40 form a corner, and the guide part 20*b* is provided near the corner. Specifically, the guide part 20*b* is provided at the rear end of the support member 50 with respect to the conveying direction A of the recording medium 2. The guide part 20*b* has the inclined surface 20*c* at an abutment part against which the front end of the recording medium 2 abuts when the front end of the recording medium 2 conveyed to the liquid ejection part 3*a* rises up from the support surface 1*a*. According to such a configuration, the inclined surface 20*c* (abutment part) can guide the recording medium 2 so that the front end of the recording medium 2 reliably enters the space between the liquid ejection part 3*a* and the support surface 1*a*.

Further, the flexible wiring boards 40 are arranged along the part from the support surface 50*d* to the side surface 50*b* of the support member 50. The protection member 30 is provided so as to face the side surface 50*b* of the support member 50. The flexible wiring boards 40 are located between the support member 50 and the cover member 20 and between the support member 50 and the protection member 30. The end of the protection member 30 on the conveyance path side is arranged in close proximity to the edge of the inclined surface 20*c* of the guide part 20*b*. According to such a configuration, it is possible to prevent a microdroplet, not deposited on the recording medium 2, but rather floating around and emanating from a liquid ejected by the recording element substrate 10, from being deposited on an electric member such as the flexible wiring board 40. Note that deposition of a microdroplet on an electric member may cause an electric malfunction.

The structure in which the protection member 30 and the cover member 20 are arranged in close proximity to each other will be specifically described below.

Figure 6A:
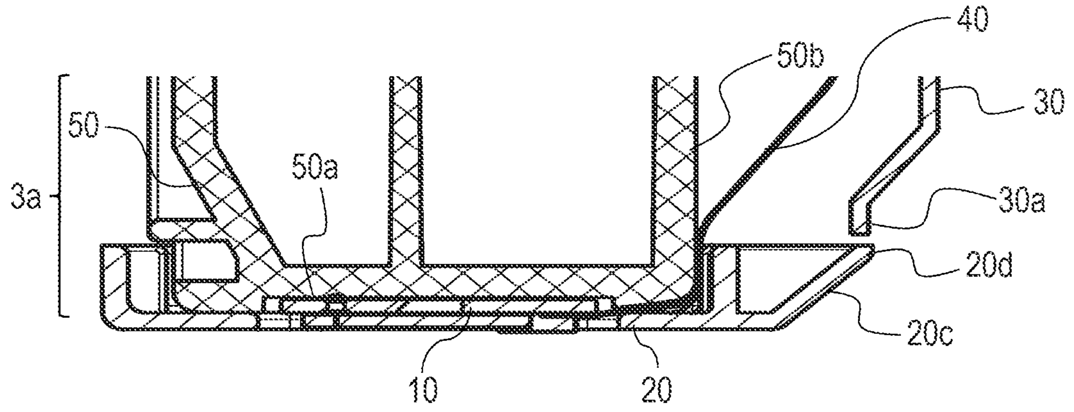
FIG. 6A, FIG. 6B and FIG. 6C are schematic diagrams illustrating examples of arrangements of a protection member and the cover member.
Figure 6B:
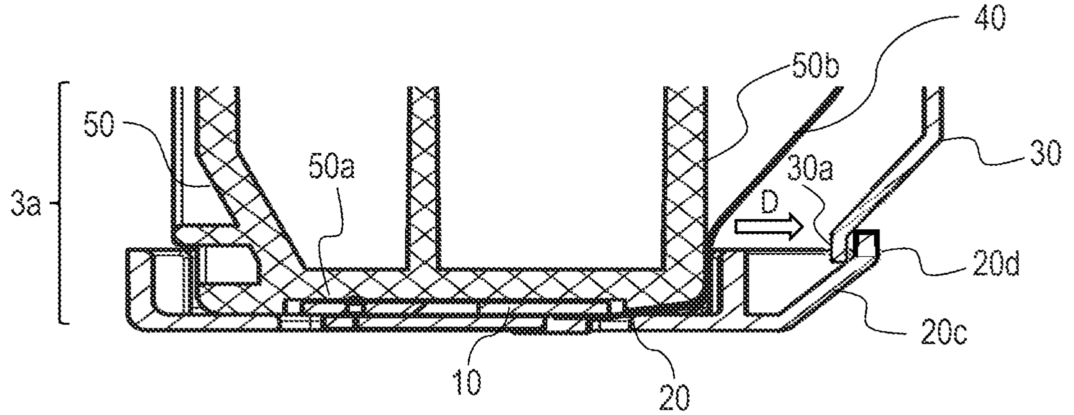
Figure 6C:
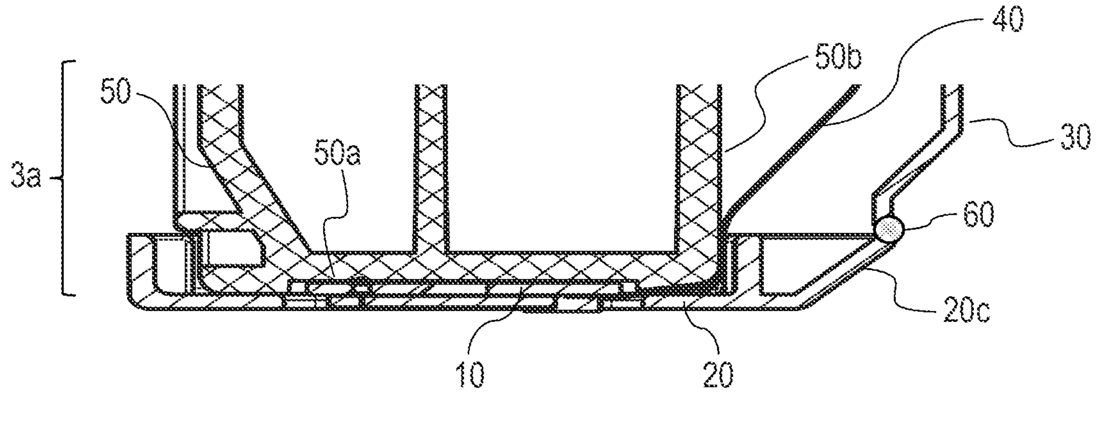

FIG. 6A to FIG. 6C are schematic diagrams illustrating an example of arrangement of the protection member 30 and the cover member 20. FIG. 6A to FIG. 6C illustrate the structure corresponding to the cross section of the liquid ejection head 3 illustrated in FIG. 4A and FIG. 4B.

FIG. 6A illustrates a first example of arrangement. In the first example of arrangement, an end 30*a* on the conveyance path of the protection member 30 and an edge 20*d* of the inclined surface 20*c* of the guide part 20*b* face each other. A narrower spacing between the end 30*a* of the protection member 30 and the edge 20*d* of the guide part 20*b* increases the effect of suppressing deposition of floating microdroplets on the electric member.

FIG. 6B illustrates a second example of arrangement. In the second example of arrangement, the end 30*a* on the conveyance path of the protection member 30 and the edge 20*d* of the inclined surface 20*c* of the guide part 20*b* are overlapped with each other. In such a case, since the path on which floating microdroplets move to the electric member can be longer than in the first example of arrangement, the effect of suppressing deposition of microdroplets on the electric member can be further increased.

In the case described above, it is preferable that the end 30*a* of the protection member 30 be located between the edge 20*d* of the guide part 20*b* and the side surface 50*b* of the support member 50. In such a case, no member that obstructs the guidance of the recording medium 2 is present downstream of the cover member 20 near the inclined surface 20*c*.

Thus, the recording medium 2 can be reliably guided to the space between the support surface 1*a* and the liquid ejection part 3*a*.

Further, the end 30*a* of the protection member 30 and the edge 20*d* of the guide part 20*b* may be in close contact with each other. This can more effectively suppress deposition of floating microdroplets on the electric member.

In the case described above, a pushing member that pushes the end 30*a* of the protection member 30 toward the edge 20*d* of the guide part 20*b* may be provided. In FIG. 6B, the arrow D represents a pushing direction of the pushing member. The pushing member may be formed of a resilient member such as a spring or a rubber, for example. For example, with a configuration in which one end of a spring member is in contact with the side surface 50*b* of the support member 50 and the other end of the spring member is in contact with the end 30*a* of the protection member 30, the end 30*a* of the protection member 30 can reliably be in close contact with the edge 20*d* of the guide part 20*b*. In such a case, however, the spring member is required to be attached to the side surface 50*b* of the support member 50 so as to avoid the flexible wiring boards 40.

FIG. 6C illustrates a third example of arrangement. In the third example of arrangement, a sealing material 60 that seals a gap between the end 30*a* of the protection member 30 and the edge 20*d* of the guide part 20*b* is provided. With the sealing material 60 being provided, it is possible to more reliably suppress deposition of floating microdroplets on the electric member. As the sealing material 60, a resin (for example, an epoxy resin) may be used.

Modified Example

In the liquid ejection head 3 of the present embodiment described above, in terms of suppression of jamming, the guide part 20*b* of the cover member 20 may be of any structure as long as it can guide the recording medium 2 having a curved leading end to the space between the support surface 1*a* and the liquid ejection part 3*a*.

Figure 7:
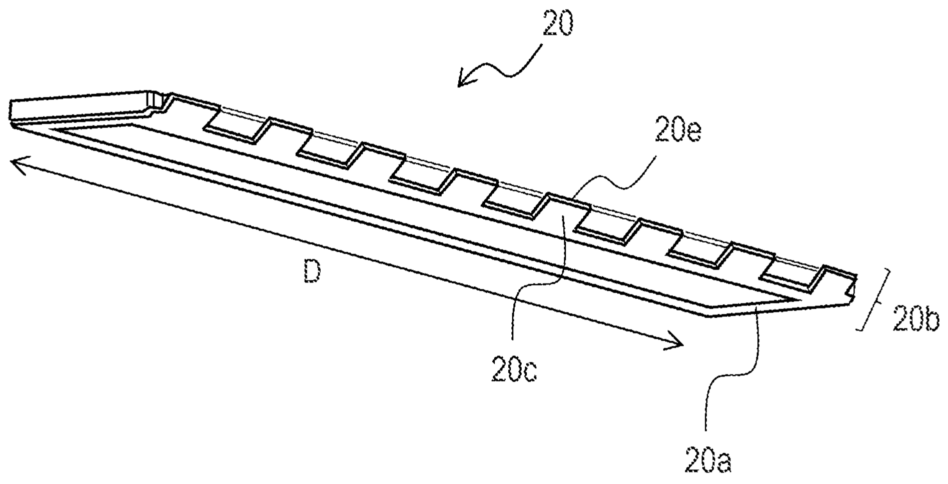
FIG. 7 is a schematic diagram illustrating a modified example of the cover member.

FIG. 7 is a schematic diagram illustrating a modified example of the cover member 20. In the guide part 20*b*, the width direction D of the conveyance path for the recording medium 2 having a plurality of guides 2*e* arranged at a predetermined interval in the width direction (the arrow D in FIG. 7) of the conveyance path for the recording medium 2 is the same as the longitudinal direction of the cover member 20. Each guide 20*e* has an inclined surface 20*c*. When the inclined portion of the guide part 20*b* is divided into multiple portions in the longitudinal direction in such a way, the frictional resistance when the leading end of the recording medium 2 comes into contact with the inclined surface 20*c* can be reduced, and as a result, jamming can be more effectively suppressed. Note that the number or guides 20*e*, the width of the guide 20*e*, or the interval between the guides 20*e* can be changed as appropriate.

In the liquid ejection head 3 described above, a metal such as a sheet metal or a resin material can be used as the material of the cover member 20. When the cover member 20 is made of a resin, various shapes of cover members 20 can be formed. Therefore, the cover member 20 having the inclined surface 20*c* as described above is easily formed. Further, even when the cover member 20 is made of a resin, if the protection member 30 that is a separate member from the cover member 20 as described above is made of a metal, a shield effect for the flexible wiring boards 40 or the electric wiring board 90 can be obtained. In such a case, to obtain an effective shield effect, it is preferable that the area of a portion of the flexible wiring boards 40 which is covered with the protection member 30 be larger than the area of a portion of the flexible wiring boards 40 which is covered with the cover member 20.

When the cover member 20 is made of a metal, an electric shield can be formed together with the protection member 30. Accordingly, for example, it is possible to obtain a shield effect that suppresses electromagnetic emission noise of the flexible wiring boards 40, the electric wiring board 90, or the like.

Further, the inclined surface 20*c* may be a planar surface or may be a curved surface.

Furthermore, although a part of the cover member 20 forms the guide part 20*b*, the embodiment is not limited thereto. The guide part 20*b* may be formed of a separate member from the cover member 20. Note that, when a part of the cover member 20 forms the guide part 20*b*, manufacturing cost can be reduced.

Further, although the liquid ejection head 3 is of the thermal system that generates air bubbles by using a heat-generating element to eject liquids, the embodiment is not limited thereto. The liquid ejection head 3 may be of other various liquid ejection systems such as a piezo system and the like.

Although configured to circulate a liquid between a tank and the liquid ejection head 3, the embodiment is not limited thereto. For example, tanks may be provided upstream and downstream of the liquid ejection head 3, respectively, and a liquid may be caused to flow from one of the tanks to the other tank without circulation of the liquid.

According to the present embodiment, it is possible to make jamming less likely to occur even when the leading end of a recording medium is curved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-074246, filed Apr. 26, 2021, which is hereby incorporated by reference herein in its entirety.

What is claimed is:

1. A liquid ejection head comprising:

a liquid ejection part configured to eject a liquid, the liquid ejection part including a recording element substrate having an ejection orifice configured to eject a liquid, and a support member that supports the recording element substrate; and a guide part provided upstream of the liquid ejection part with respect to a conveying direction of a recording medium and configured to guide a front end of the recording medium conveyed to the liquid ejection part, wherein the guide part is provided at a rear end of the support member with respect to the conveying direction of the recording medium, wherein the guide part has an inclined surface inclined so as to be more spaced apart from a conveyance path for the recording medium as the inclined surface is more distant from the liquid ejection part, and wherein the inclined surface is provided upstream of the rear end of the support member with respect to the conveying direction of the recording medium.

2. The liquid ejection head according to claim 1, further comprising a cover member having an opening that exposes the recording element substrate and being supported by the support member, wherein a part of the cover member forms the guide part.

3. The liquid ejection head according to claim 2, further comprising:

an electric wiring member electrically connected to the recording element substrate and supported by the support member; and a protection member provided so as to face a side surface of the support member on the rear end side, wherein the electric wiring member is located between the support member and the cover member and between the support member and the protection member.

4. The liquid ejection head according to claim 3, wherein an end of the protection member on the conveyance path side is arranged in close proximity to an edge of the inclined surface of the guide part.

5. The liquid ejection head according to claim 4, wherein the end of the protection member on the conveyance path side and the edge of the inclined surface of the guide part face each other.

6. The liquid ejection head according to claim 4, wherein the end of the protection member on the conveyance path side and the edge of the inclined surface of the guide part overlap each other.

7. The liquid ejection head according to claim 6, wherein the end of the protection member on the conveyance path side is located between the edge of the inclined surface of the guide part and the side surface of the support member.

8. The liquid ejection head according to claim 6, wherein the end of the protection member on the conveying path side and the edge of the inclined surface of the guide part are in close contact with each other.

9. The liquid ejection head according to claim 6, further comprising a pushing member that pushes the end of the protection member on the conveying path side toward the edge of the inclined surface of the guide part.

10. The liquid ejection head according to claim 4, further comprising a sealing material that seals a gap between the end of the protection member on the conveying path side and the edge of the inclined surface of the guide part.

11. The liquid ejection head according to claim 3, wherein the cover member is made of a resin, and the protection member is made of a metal.

12. The liquid ejection head according to claim 11, wherein in the electric wiring member, the area of a portion covered with the protection member is larger than the area of a portion covered with the cover member.

13. The liquid ejection head according to claim 1, wherein the guide part comprises a plurality of guides arranged at a predetermined interval in a width direction of the conveyance path for the recording medium, wherein each of the guides has the inclined surface.

14. The liquid ejection head according to claim 1, wherein the inclined surface is a planar surface.

15. The liquid ejection head according to claim 1, wherein the inclined surface is a curved surface.

16. A liquid ejection head comprising:

a liquid ejection part configured to eject a liquid, the liquid ejection part including a recording element substrate having an ejection orifice configured to eject a liquid, and a support member that supports the recording element substrate; and a guide part provided upstream of the liquid ejection part with respect to a conveying direction of a recording medium, wherein the guide part is provided at a rear end of the support member with respect to the conveying direction of the recording medium, wherein the guide part has an abutment part against which a front end of the recording medium abuts when the front end of the recording medium conveyed toward the liquid ejection part rises up from a support surface for the recording medium, and the abutment part is configured to guide the front end of the recording medium so that the front end enters a space between the liquid ejection part and the support surface, and wherein the abutment part is provided upstream of the rear end of the support member with respect to the conveying direction of the recording medium.

17. A liquid ejection apparatus comprising:

a liquid ejection head including a liquid ejection part configured to eject a liquid, the liquid ejection part including a recording element substrate having an ejection orifice configured to eject a liquid, and a support member that supports the recording element substrate, and a guide part provided upstream of the liquid ejection part with respect to a conveying direction of a recording medium and configured to guide a front end of the recording medium conveyed to the liquid ejection part, wherein the guide part is provided at a rear end of the support member with respect to the conveying direction of the recording medium, and wherein the guide part has an inclined surface inclined so as to be more spaced apart from a conveyance path for the recording medium as the inclined surface is more distant from the liquid ejection part; and a conveyance unit configured to convey a recording medium toward the liquid ejection head, wherein the guide part of the liquid ejection head is located upstream with respect to the conveying direction of the recording medium, and wherein the inclined surface is provided upstream of the rear end of the support member with respect to the conveying direction of the recording medium.

* * * * *